Oct. 3, 1950 — J. W. KARSTED — 2,524,171
DRIP CHANNEL FOR VEHICLES HAVING CONVERTIBLE TOPS
Filed Sept. 20, 1948 — 2 Sheets-Sheet 1
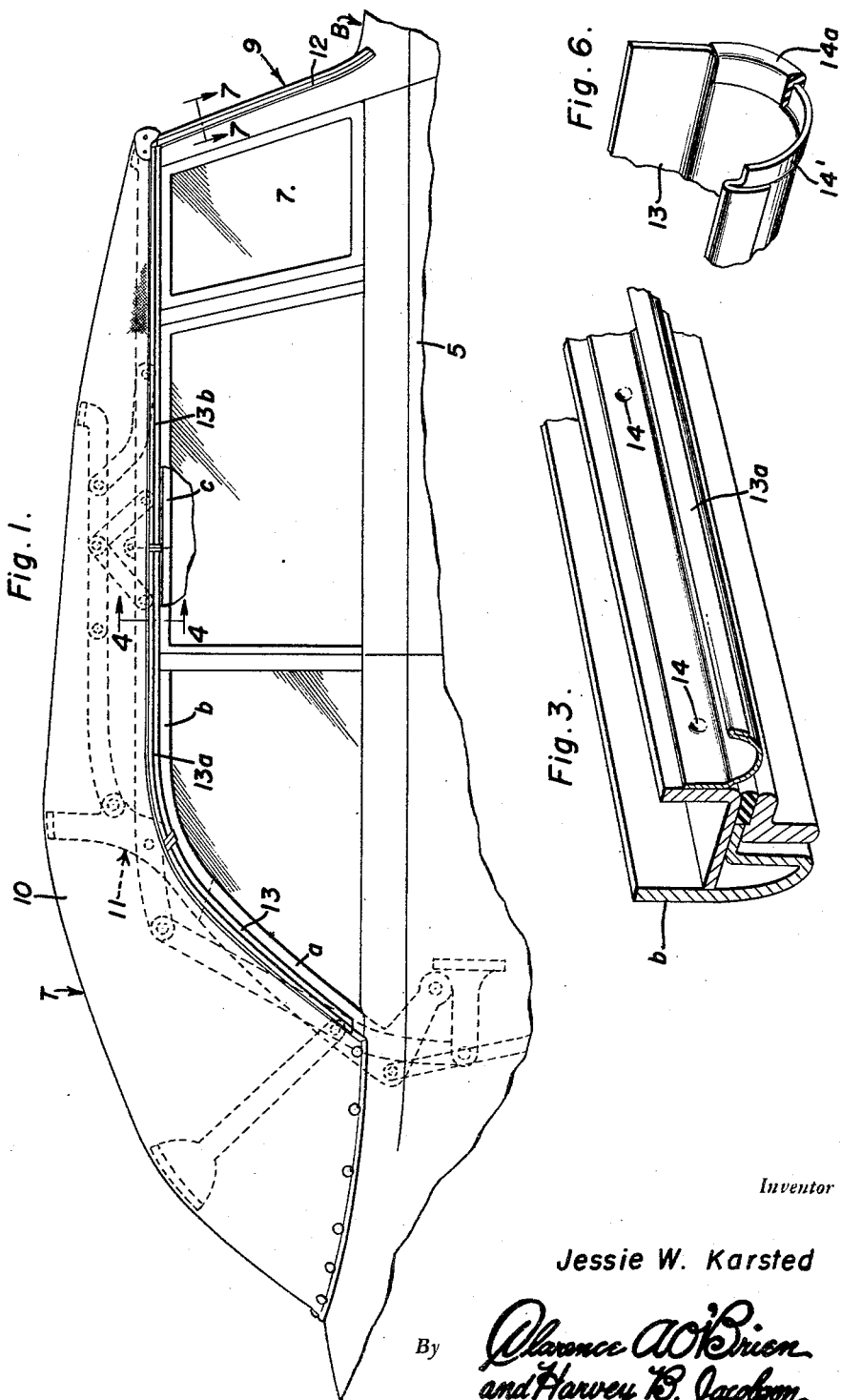
Inventor
Jessie W. Karsted Oct. 3, 1950      J. W. KARSTED      2,524,171
DRIP CHANNEL FOR VEHICLES HAVING CONVERTIBLE TOPS
Filed Sept. 20, 1948      2 Sheets-Sheet 2
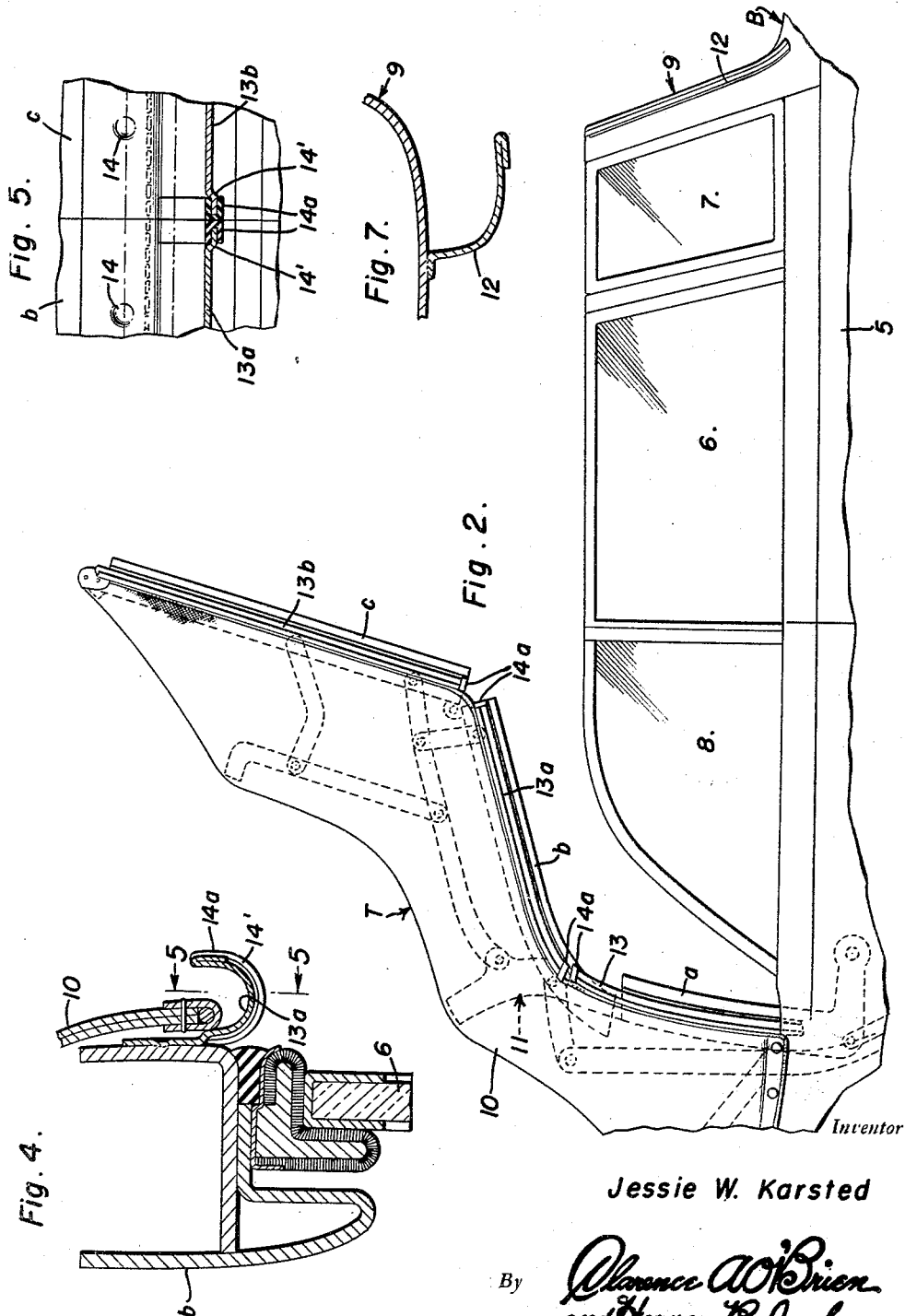
Inventor
Jessie W. Karsted Patented Oct. 3, 1950

2,524,171

UNITED STATES PATENT OFFICE 2,524,171

DRIP CHANNEL FOR VEHICLES HAVING CONVERTIBLE TOPS

Jessie W. Karsted, Washington, D. C.

Application September 20, 1948, Serial No. 50,058

2 Claims. (Cl. 296—107)

This invention relates to vehicles having convertible tops, and has more particular reference to drip channels for such vehicles.

At the present time, vehicles having convertible tops are devoid of drip channels, so that they drain off at the sides. As a result of this, passengers of such vehicles are subjected to considerable annoyance and discomfort in rainy weather from water pouring or driving into the vehicle body when the side transparent door and window panels are opened to any material extent for ventilation, or when a door of the vehicle is opened to permit a person to alight from or get in the vehicle. In addition, the seats of the vehicle are subjected to a considerable wetting upon leaving said panels open to any material extent, or upon opening the door.

The primary object of the present invention, therefore, is to provide vehicles of the kind mentioned above with drip channels which will prevent the objectionable occurrences above mentioned, which will not interfere with collapsing of the convertible top, and which will remain in operative condition for the life of the top even thought repeatedly collapsed with the latter.

The present invention is more particularly concerned with drip channels for convertible tops which include a top fabric, and collapsible supporting means therefor including two series of pivotally connected links disposed at opposite sides of the vehicle body and connected by cross bows and by a header adapted to be releasably secured to the windshield, each series of links including pivotally connected main links which extend along the side edges of the top fabric and have their ends in butted relation when the top is raised. In accordance with the present invention, the drip channel at each side of the top consists of a plurality of rigid sections, one of which is fixed to each of the main links, said drip channel sections being arranged so that their adjacent ends will register in butted relation when the top is raised, means being provided to form a leak-proof joint at the butted ends of the drip channel sections when the top is raised.

The exact nature of the present invention will become apparent from the following description when considered in connection with the accompanying drawings, in which:

Figure 1 is a fragmentary side elevational view of a vehicle body having a convertible top and equipped with drip channels in accordance with the present invention, the top being raised.

Figure 2 is a view similar to Figure 1 with the top partly lowered or collapsed.

Figure 3 is an enlarged fragmentary perspective view showing one of the main links with the associated drip channel section attached thereto.

Figure 4 is an enlarged fragmentary transverse section taken on line 4—4 of Figure 1.

Figure 5 is an enlarged fragmentary section taken on line 5—5 of Figure 4.

Figure 6 is a fragmentary perspective view, partly broken away and in section, showing an end portion of one of the drip channel sections.

Figure 7 is an enlarged fragmentary section taken on line 7—7 of Figure 1.

Referring in detail to the drawings, an embodiment of the present invention is shown in connection with a vehicle body B having a conventional convertible or let-down vehicle top T of the outrigger type, which usually has power operated means for raising and lowering the same. The body has a door 5 at each side provided with upper transparent panels 6 and 7, and a window 8 at each side, and a fixed front windshield at 9. The top includes a top fabric 10, and collapsible supporting means 11 therefor including two series of pivotally connected links disposed at opposite sides of the vehicle body and connected by cross bows and by a header adapted to be releasably secured to the windshield. The two series of links are exact duplicates as generally disclosed in the U. S. Patent to J. Falcon, No. 2,331,603, dated October 12, 1943, and only one of such series of links is shown by dotted lines in the drawings. Each series of links include main pivotally connected links at $a$, $b$ and $c$ which extends along a side edge of the top fabric and adjacent ends of which are adapted to move into butting relation when the top is raised.

According to the illustrated embodiment of the present invention, an open-ended front drip channel section 12, preferably formed of metal and welded to the frame of the windshield as shown in Figure 7, is permanently fixed to the frame member at each side of the windshield, and open-ended rear drip channel sections 13, 13$a$ and 13$b$ are respectively fixed to the main links $a$, $b$ and $c$. The drip channel sections 13, 13$a$ and 13$b$ are preferably formed of metal and have vertical extensions on their inner sides fastened to the respective links by suitable means such as by spot welding at 14 (Figure 3). The drip channel sections 13, 13$a$ and 13$b$ extend under and outwardly beyond the top fabric 10 as clearly shown in Figure 4, and they are so proportioned and arranged that their adjacent ends move into registered butted relation when the top is raised.

Suitable means is provided to form a leak-proof joint at the butted ends of the sections 13, 13a and 13b when their adjacent ends are in butted relation. As shown, this may be accomplished by outwardly offsetting the ends of the drip channel sections as at 14' and providing suitable rubber or like sealing gaskets 14a on these offset ends. It will thus be apparent that the drip channel sections carried by the top may readily collapse with the latter.

The front end of each drip channel section 13b is disposed to discharge water into the upper end of the front drip channel section 12 on the adjacent side of the windshield, and it will be apparent that water may be lead from the lower ends of the rear drip channel sections 13 to the outer side of the body by simply slipping an end of a short rubber tube over the lower end of each of said drip channel sections 13 when the approach of rain is indicated. However, this may be taken care of in other ways and is not specifically illustrated as it forms no part of the present invention per se.

From the foregoing description, it is believed that the construction, operation and advantages of the present invention will be readily understood and appreciated by those skilled in the art. Although a specific embodiment of the invention has been disclosed, it will be understood that various modifications and changes in details of construction may be made without departing from the spirit of the invention as claimed.

What is claimed as new is:

1. The combination of a convertible vehicle top including top fabric and collapsible supporting means therefor, said supporting means including at least two rigid links disposed at one side of the top and having adjacent ends in abutting relation when the top is raised and a pivot connecting the adjacent end portion of said links together, a side edge portion of said top fabric being downturned over the outer surface of said links, two separate and rigid drip channel sections coextensive with and disposed at the outside of the respective links, longitudinally extending vertical flanges provided at inner edges of said channel sections, said flanges being disposed between the downturned porton of the top fabric and the outer surfaces of the respective links and being secured to the latter, the adjacent end portions of said channel sections being outwardly offset, and a pair of channel-shaped sealing gaskets of a substantially U-shaped cross-section positioned on the offset end portions of the respective channel sections and having bight regions which are in leak-proof abutment in a radial plane with respect to said pivot when the top is raised, inner walls of said gaskets being of such thickness as to be flush with the inner surfaces of the channel sections, whereby to afford smooth flow of liquid through the latter.

2. As an article of manufacture, drip channel structure for convertible vehicle tops, said structure comprising a set of rigid drip channel sections each provided at one longitudinal edge thereof with a longitudinally extending vertical flange adapted to be secured to a rigid side link of a convertible vehicle top, at least one end portion of each channel section being outwardly offset, and a channel-shaped sealing gasket of a substantially U-shaped cross-section positioned on the offset end portion of each channel section and having a bight region adapted for leak proof abutment with a similar gasket on another channel section adjacent thereto, the inner wall of said sealing gasket being of such thickness as to be flush with the inner surface of the associated channel section, whereby to afford smooth flow of liquid through the latter.

JESSIE W. KARSTED.

REFERENCES CITED

The following references are of record in the file of this patent:

UNITED STATES PATENTS

| Number | Name | Date |
|---|---|---|
| 1,328,383 | Ludlow | Jan. 20, 1920 |
| 1,670,465 | Marshall | May 22, 1928 |
| 1,826,922 | Carr | Oct. 13, 1931 |
| 2,319,723 | Crowe et al. | May 18, 1943 |

FOREIGN PATENTS

| Number | Country | Date |
|---|---|---|
| 108,418 | Great Britain | Aug. 9, 1917 |